July 26, 1966  H. H. BRITTEN ETAL  3,263,150
CONTROL ARRANGEMENT FOR STATIC INVERTERS
Filed April 21, 1961
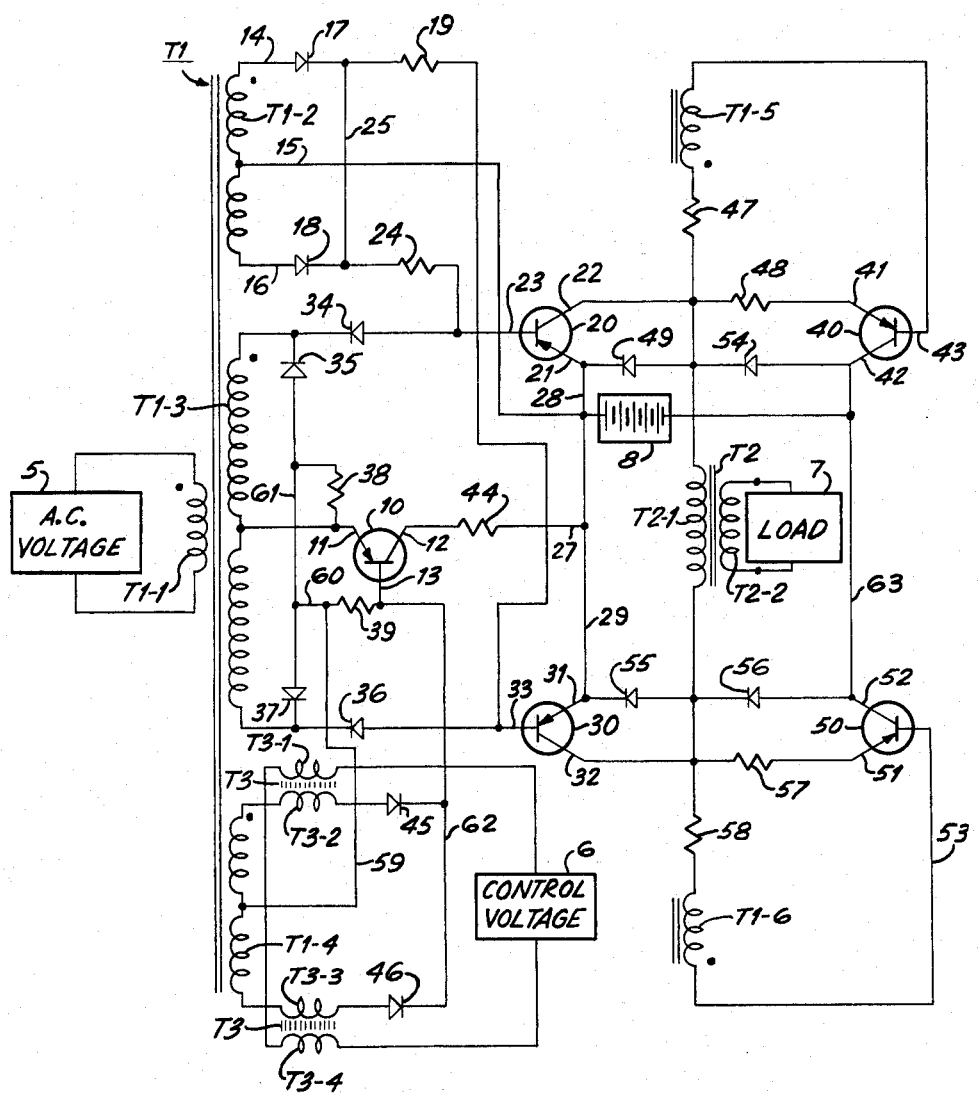
INVENTORS.
JOHN H. CUTLER
BY HAROLD H. BRITTEN
ATTORNEY United States Patent Office 3,263,150
Patented July 26, 1966

3,263,150
CONTROL ARRANGEMENT FOR
STATIC INVERTERS
Harold H. Britten and John H. Cutler, Waynesboro, Va., assignors to General Electric Company, a corporation of New York
Filed Apr. 21, 1961, Ser. No. 104,681
13 Claims. (Cl. 321—45)

This invention relates to static inverters, and more particularly, to static inverters using electronic switching means for supplying power to a reactive load.

The function of an inverter is to convert a direct current into an alternating current. Effectively, a static inverter may be considered to be means for alternately connecting the terminals of a load to opposite terminals of a direct current source. In other words, the static inverter provides the means for performing a switching function, the result of which is to apply pulses of direct current to a load with each succeeding pulse being of opposite polarity from its predecessor.

A large number of devices have been developed for performing the particular switching function required in static inverter operation. However, a problem arises when attempting to switch the voltage across, or the current through, a reactive device. For example, in the case of an inductive load, removal of the source of current flow in a first direction prior to reversal of that current flow, creates a counter-electromotive force across the inductance which tends to sustain the original current flow until the stored energy is dissipated. Alternating current load circuits often require a specific waveform in the output and such reactive effects result in the creation of undesirable, inferior waveforms. When an output transformer is used, it has been discovered that such inferior waveforms may be prevented by immediately shorting the output following each switching action.

An object of the invention is to provide an improved static inverter capable of supplying reactive loads with a discrete alternating current waveform.

Another object of the invention is to provide a static inverter using an output transformer and incorporating means for shorting the primary of the transformer immediately following each application of a direct current pulse thereto.

In order to regulate the voltage output of an inverter, the duration of the direct current pulse applied during each half cycle of operation may be controlled. This form of voltage regulation, recognized as pulse width modulation, creates an additional problem. Because the duration of application of pulses to the load may be continuously variable, if shorting of the load upon termination of each pulse is to be effective, the shorting must be synchronized to occur simultaneously with the termination of each applied pulse.

Another object of the invention is to provide a static inverter using pulse width modulation for voltage regulation and incorporating means for insuring a discrete alternating current waveform at the output.

In accordance with the embodiment described and illustrated herein, the invention comprises a transistor bridge circuit controlled by a switching transistor to alternately apply a D.C. voltage to opposite terminals of an output transformer connected across one diagonal of the bridge circuit. The switching transistor is in turn controlled by a magnetic amplifier in order to establish the duration of each pulse of D.C. power applied to the output transformer. In operation, current is applied to the output transformer by enabling, i.e., rendering conductive, the transistors in nonadjacent branches of the bridge circuit. The switching transistor is arranged to disable, i.e., render non-conductive, one of the conducting branch transistors when the applied pulse is to be terminated. Immediately upon termination of such pulse a unidirectional discharge path comprising the output transformer and still-conducting branch transistor is available through which the counter-electromotive forces developed in the output transformer may be dissipated.

The features of the invention which are believed to be novel are set forth with particularity in the appended claims. The invention itself, however, both as to its organization and method of operation, together with further objects and features thereof, may best be understood by reference to the following description taken in connection with the accompanying drawing wherein an illustrative embodiment is presented in schematic form.

Referring to the drawing, it will be seen to comprise four basic parts: the transistor bridge circuit occupying the right-hand portion of the figure and including transistors 20, 30, 40 and 50; the A.C. switching circuit, developed around transistor 10; the magnetic amplifier circuit in the lower left quadrant of the figure; and transformer T1, the primary of which is supplied by A.C. voltage 5.

As described more fully hereinafter, direct current source 8 is connected across primary winding T2-1 of output transformer T2 with alternating polarity for periods of time determined by the magnitude of control voltage source 6. This connection is accomplished by simultaneously rendering conductive transistors 20 and 50, or transistors 30 and 40. With either pair of transistors conducting a current path is available from direct current source 8 to transformer primary T2-1, the direction of current flow through the load being determined by the particular pair of transistors conducting. Thus, with transistors 20 and 50 conducting, current flows from source 8 through primary winding T2-1 from top to bottom, whereas with transistors 30 and 40 conducting, current flows from source 8 through primary winding T2-1 from bottom to top.

The transistor pairs are alternately enabled, or rendered conducting, under the joint control of alternating current source 5 and switching transistor 10. Alternating current source 5, acting through transformer secondary winding T1-2, determines the particular pair of transistors conducting, and transistor 10 determines the duration of the conduction period. Transistor 10 is in turn controlled by the magnetic amplifier circuit which receives energizing signals from transformer secondary winding T1-4 and control signals from control voltage source 6. Diodes 49, 54, 55, and 56, are connected in the transistor bridge circuit and in conjunction with circuitry including transformer secondaries T1-5 and T1-6 provide means for maintaining one of the conducting transistors in an energized state for a short period of time after the de-energization of the other transistor in each pair.

For purposes of detailed description, assume that A.C. voltage source 5 supplies a square wave to primary T1-1 of transformer T1. Also, assume that control voltage 6 is of a magnitude which does not initially saturate the cores of magnetic amplifier T3.

Center tapped transformer secondary winding T1-2 in conjunction with diodes 17 and 18 and resistors 19 and 24 provides a D.C. voltage for normally biasing transistors 20 and 30 to a nonconducting state. In accordance with standard drafting convention, when a positive voltage is applied to the dotted terminal of primary winding T1-1 a voltage is induced which is positive at the dotted terminal of secondary winding T1-2. The induced voltage forward biases diode 17 and therefore creates a positive potential difference between conductor 25 and the center tap of transformer secondary T1-2. The center tap of transformer secondary T1-2 is connected via conductors 15, 28, and 29 to emitter electrodes 21 and 31 of transistors 20 and 30 and conductor 25 is connected via resistors 19 and 24 to base electrodes 23 and 33 of transistors 20 and 30, thus a reverse bias is maintained across these transistors tending to keep them nonconducting.

Transistor 10 is employed as a switch to complete an energizing circuit for either transistor 20 or transistor 30 in accordance with the polarity of the voltage induced in transformer secondary T1-3. Every application of voltage to primary T1-1 is effective to forward bias transistor 10 and thereby cause it to become conducting. When positive voltage is applied to the dotted terminal of primary T1-1, for example, a voltage is induced in secondary T1-3 which is positive at the dotted terminal thereof. The voltage at the dotted end of secondary T1-3 is blocked due to the orientation of diodes 34 and 35; however, the opposite end of secondary T1-3, being negative, finds current paths through suitably poled diodes 36 and 37. Consequently, transistor 10 is forward biased by the circuit commencing at the center tap of secondary T1-3 and including emitter 11, base 13, resistor 39, diode 37 and the lower terminal of secondary T1-3. The magnitude of this forward bias is designed to switch transistor 10 into a full conducting state, thereby establishing a low impedance path emitter 11 and collector 12. Establishment of conduction in transistor 10 is effective to supply a forward biasing voltage to transistor 30 which may be traced from the center tap of secondary T1-3, through emitter electrode 11, collector electrode 12, resistor 44, conductors 27 and 29, emitter 31 and base electrode 33 of transistor 30, and diode 36 to the lower terminal of secondary winding T1-3. The application of this forward bias renders transistor 30 conducting. At this time transistor 20 remains nonconducting due to the reverse voltage previously attributed to the voltage induced in transformer secondary T1-2.

The conduction of transistor 30 establishes a path from the positive terminal of D.C. voltage source 8 to the lower terminal of the primary T2-1 of output transformer T2. Connection must also be established between the negative terminal of D.C. voltage source 8 and the upper terminal of transformer primary T2-1. This connection is simultaneously established through transistor 40. The application of a positive voltage to the dotted terminal of transformer primary T1-1 causes a positive voltage to be induced at the dotted terminals of secondaries T1-5 and T1-6. The induced voltage in secondary T1-6 is effective to maintain transistor 50 in a nonconducting state by reverse biasing it in the circuit comprising the dotted terminal of secondary T1-6, base electrode 53, emitter electrode 51, resistors 57 and 58, and the upper terminal of secondary T1-6. The voltage induced in secondary T1-5, however, renders transistor 40 conducting in the forward biasing circuit comprising the dotted terminal of T1-5, resistors 47 and 48, emitter electrode 41, base electrode 43, and the upper terminal of secondary T1-5. Thus, within the transistor bridge circuit, the initial application of a positive potential to the dotted terminal of primary T1-1 results in placing transistors 30 and 40 in a conducting state.

The conduction of transistor 30 and transistor 40 is effective to establish a current through output transformer primary T2-1 flowing in an upward direction in the circuit configuration illustrated. Tracing the path of this current flow, it will be seen to commence at the positive terminal of D.C. voltage source 8 and include conductor 29, emitter electrode 31 and collector electrode 32 of transistor 30, primary winding T2-1, resistor 48, emitter 41 and collector 42 of transistor 40, and the negative terminal of D.C. voltage source 8. This current flow induces a voltage in the secondary winding T2-2 which supplies load 7.

If no further circuit interruptions occur transistors 30 and 40 will remain in the conducting state until the polarity of the input voltage applied to primary winding T1-1 is reversed, at which time a sequence of events occurs which renders transistors 20 and 50 conductive as described hereinafter.

In order to modulate the amount of power supplied to the output, however, means are provided for terminating the conduction of the transistors in the bridge circut before the completion of a full half cycle of operation. The instant invention discloses the use of a magnetic amplifier arrangement to control the duration of the application of pulses of power. The actual control is effectuated by rendering transistor 10 nonconductive at a predetermined time and thereby opening the energization path of either transistor 20 or transistor 30.

The positive voltage assumed to have been applied to transformer primary T1-1 also induces a positive voltage at the dotted end of transformer secondary T1-4. As illustrated in the drawing, the terminals of secondary T1-4 are connected to the gate windings T3-2 and T3-3 of magnetic amplifier T3. As well known, magnetic amplifiers supply a current pulse when their cores become saturated and the period preceding this saturation is determined by the amount of current flowing through their control windings. Because it has been assumed that control voltage 6 was of a magnitude that does not saturate the cores of magnetic amplifier T3, the initial current induced in secondary T1-4 is expended in increasing the saturation of the magnetic amplifier. Within a finite period of time, determined by the magnitude of the current induced in secondary T1-4 and the magnitude of control voltage 6, magnetic amplifier T3 becomes saturated and the impedance of gate windings T3-2 and T3-3 becomes small, effectively establishing a short circuit between the terminals of secondary T1-4 and the anodes of diodes 45 and 46. The cathodes of diodes 45 and 46 are connected via conductor 62 to base electrode 13 of transistor 10. Base electrode 13 is also connected through resistor 39 to the center tap of secondary T1-4. In view of conventional rectifying action it is obvious that once the core of magnetic amplifier T3 becomes saturated, a voltage is applied across resistor 39 that is positive on the side connected to base electrode 13 of transistor 10. Because diodes 45 and 46 in conjunction with secondary windings T1-4 form a full wave rectifier, the voltage applied across resistor 39 will always be of the same polarity irrespective of polarity of the voltage applied to primary T1-1.

The voltage created by the output from the magnetic amplifier circuitry is polarized to reverse bias transistor 10 and thereby render it nonconducting. The particular circuit comprises the center tap of secondary T1-4, conductors 59, 60, and 61, resistor 38, emitter electrode 11 and base electrode 13 of transistor 10, conductor 62, and either diode 45 and gate winding T3-2 to secondary T1-4, or diode 46 and gate winding T3-3 to secondary T1-4. Nonconduction of transistor 10 opens the energization circuit of transistor 30 which immediately stops conduction and removes the positive terminal of D.C. voltage source 8 from the lower terminal of transformer primary T2-1.

As previously mentioned, a reactive load develops an electromotive force which must be immediately dissipated upon removal of voltage, in order to prevent the creation of inferior waveforms. To do this, transformer primary T2-1 must immediately experience a short circuit following removal of the voltage source. This short circuit is provided by the circuit path comprising the upper terminal of primary T2-1, resistor 48, emitter electrode 41 and collector electrode 42 of conducting transistor 40, conductor 63, diode 56, and the lower terminal of transformer primary T2-1. It should be recognized that the short circuit established is available immediately upon nonconduction of transistor 30 and is made possible because transistor 40 continues to conduct as long as the present cycle of operation is in process under control of the voltage applied to primary T1–1 by A.C. voltage source 5.

Circuit functioning in response to the positive cycle of a signal applied to the dotted terminal of transformer primary T1–1 having been described, the completion of a cycle of operation requires consideration of the circuit functioning in response to a negative signal applied to the dotted terminal.

The bias voltage supplied via transformer secondary T1–2 and the cut-off voltage supplied via transformer secondary T1–4 and magnetic amplifier T3 are unaffected by reversal of input polarity. This is a result of the rectifier configuration at the output terminals of the secondary windings. The rectifiers are polarized to create a positive potential difference from their cathodes to the center tap of the respective secondaries at all times. In view of these facts, the previous description is applicable to much of the circuit operation, even when a different polarity input is being applied to transformer primary T1–1.

The difference in operation due to negative polarity at the input of transformer primary T1–1 occurs in the A.C. switching circuit of transistor 10 and in the transistor bridge circuit. In this cycle of operation, transistors 20 and 50 are rendered conducting and D.C. voltage source 8 is connected to output transformer primary T2–1 in the opposite direction from that previously considered.

A negative voltage applied to the dotted terminal of transformer primary T1–1 induces a voltage in secondary T1–3, polarized negatively at the dotted terminal thereof. The orientation of diodes 34 and 35 causes this voltage to be applied to base electrode 23 of transistor 20 and to base electrode 13 of transistor 10, the latter connection being made through resistor 39. The orientation of diodes 37 and 36 isolates the positive voltage appearing at the lower terminal of transformer secondary T1–3 from the rest of the circuit. Due to the presence of resistors 38 and 39, the relatively positive voltage appearing at the center tap of transformer secondary T1–3 creates a forward bias on transistor 10 when applied to the emitter thereof. This forward bias initiates conduction in transistor 10, and as mentioned hereinbefore, the impedance between emitter electrode 11 and collector electrode 12 decreases. An enabling circuit is thus established for transistor 20, comprising the center tap of transformer secondary T1–3, emitter electrode 11 and collector electrode 12 of transistor 10, resistor 44, conductors 27 and 28, emitter electrode 21 and base electrode 23 of transistor 20, rectifier 34, and the dotted terminal of transformer secondary T1–3. The polarity of the voltage induced in the other portion of secondary winding T1–3 in conjunction with the orientation of rectifier 36 combine to prevent a similar enabling circuit for transistor 30. Transistor 30 is maintained cut off by the reverse biasing provided between emitter electrode 31 and base electrode 33 by transformer secondary T1–2. Thus, transistor 20 only is rendered conductive.

Simultaneously, transistor 50 is supplied with a forward bias by the voltage induced in transformer secondary T1–6, and is rendered conductive.

The conduction of transistors 20 and 50 provides a path comprising the positive terminal of D.C. voltage source 8, emitter electrode 21 and collector electrode 22 of transistor 20, output transformer primary T2–1, resistor 57, emitter electrode 51 and collector electrode 52 of transistor 50, and the negative terminal of D.C. voltage source 8. Current flows in this path traversing the primary T2–1 from top to bottom, as illustrated in the drawing. Thus, during an entire cycle of operation A.C. power is supplied to load 7.

Upon expiration of the time required to saturate the core of magnetic amplifier T3, transistor 10 is cut off disabling transistor 20 and opening the energization path of transformer primary T2–1. The specific sequence and method of operation has been previously described. Once again, the voltage produced by the electromotive forces in transformer primary T2–1 must be dissipated to avoid inferior waveforms from disturbing the output. The counter-electromotive force in this instance is polarized positive at the lower terminal of primary T2–1 and a short circuit path is provided including: resistor 57, emitter electrode 51 and collector electrode 52 of transistor 50, and rectifier 54.

The above description illustrates how the invention may be employed to develop a static inverter having means for controlling the power delivered to a reactive load. As shown, pulses of alternate polarity are modulated by a magnetic amplifier and applied to the primary of an output transformer. In order to efficiently dissipate the electromotive forces present in a reactive load, an independent low impedance path comprising a rectifying means is furnished.

While there has been shown a particular embodiment of this invention, it will, of course, be understood that it is not wished to be limited thereto since modifications may be made both in the circuit arrangement and in the instrumentalities employed, and it is contemplated in the appended claims to cover any such modifications as fall within the true spirit and scope of the invention.

What is claimed as new and desired to be secured by Letters Patent of the United States is:

1. In an inverter, a source of unidirectional potential, an alternating current load, a pair of transistors, a source of alternating current potential, control means responsive to said alternating current potential to render said transistors alternately conducting at the beginning of each half cycle of said alternating current potential, said transistors being connected when conducting to pass current from said unidirectional potential source in opposite directions through said load, a source of control signals, said control means responsive to said control signals to vary the duration of each half cycle of said alternating potential during which said transistors are conducting, thereby varying the power supplied from said unidirectional potential source to said alternating current load.

2. In an inverter, a source of unidirectional potential, an alternating current load, a pair of transistors, means connected to said transistors for simultaneously rendering said transistors conducting, said transistors being connected when conducting to pass current from said unidirectional potential source through said load, means connected to one of said transistors to selectively render said one transistor non-conductive, and means to short circuit said alternating current load through the other of said transistors.

3. In a switching circuit having transistors serially connected with a load and a source of direct current, means connected to said transistors for simultaneously rendering said transistors conducting to supply power from said source to said load, disconnect means connected to one of said transistors and selectively operative to stop conduction thereof, and a unidirectional current conducting path excluding said source of direct current and comprising another of said transistors and said load, said unidirectional current conducting path being polarized to permit current flow through said load in the direction established during the simultaneous conduction of said transistors.

4. In a switching circuit having two switching means serially connected with a load and a source of direct current, a source of control voltage, said switching means being rendered simultaneously operative in response to said control voltage to conduct current to said load, means responsive to said control voltage and operative at a preselected time after initiation thereof to stop conduction in one of said switching means, and unidirectional current conducting means in circuit with said load and the other of said switching means and polarized to permit current flow through said load in the direction established by both of said switching means when conducting.

5. In a switching circuit having transistors serially connected with a load and a source of direct current, a source of alternating current, means responsive to said alternating current to simultaneously render said transistors conducting on alternate half cycles thereof, means responsive to said alternating current and operative a selective time following commencement of each said alternate half cycle to stop conduction in one of said transistors, and a unidirectional current conducting path excluding said source of direct current and comprising the other of said transistors and said load, said unidirectional current conducting path being polarized to permit current flow through said load in the direction established during the coincident conduction of said transistors.

6. In a static inverter, a four branch bridge circuit wherein each branch comprises a transistor and a unidirectional current conducting device in parallel, said unidirectional current conducting device being connected to yield a low impedance path to current flow in opposition to that created by its associated transistor when conducting, a source of direct current connected across one diagonal of said bridge circuit, reactive output means connected across the other diagonal of said bridge circuit, a source of input voltage, enabling means responsive to said input voltage substantially coincidently to render a first and second transistor conducting, said first and second transistor being in non-adjacent branches of said bridge circuit, and modulating means responsive to said input voltage and operative a preselected time after application thereof to render said first transistor non-conducting.

7. A static inverter circuit as defined by claim 6 wherein said enabling means comprises a first and second voltage responsive means individually operative upon said first and second transistors respectively, said first voltage responsive means being controlled by said modulating means.

8. In combination with a transistor bridge circuit for supplying power to a reactive load, the primary of an output transformer connected across one diagonal of said bridge circuit, a source of direct current connected across the other diagonal of said bridge circuit, a source of input signals of alternate polarity, means for selectively rendering transistors in non-adjacent branches of said bridge conductive in accordance with the polarity of said input signals, means for rendering one of said conducting transistors non-conductive a preselected time after initiation of conduction therein, and unidirectional current conducting means in series circuit relation with the other conducting transistor and said primary winding and polarized to yield a low impedance path for current flowing through said primary winding in the direction established by the two initially conducting transistors.

9. A switching circuit comprising, a transistor bridge circuit having a transistor in each leg thereof, a source of direct current connected across one diagonal of said bridge circuit, output means connected across the other diagonal of said bridge circuit, a source of input signals of alternate polarity, enabling means rendered operative in response to said input signals, means operative in response to one polarity of said input signals to render a first transistor in said bridge circuit conductive when said enabling means is operated, means responsive to said one polarity of input signals to render a second transistor in said bridge circuit conductive, said first and second transistors being in non-adjacent branches of said bridge circuit, and means operative a predetermined time after application of said input signals to disable said enabling means and thereby terminate conduction in said first transistor.

10. A switching circuit as defined in claim 9 in combination with unidirectional current conduction means serially connected with said second transistor and said output means and oriented to yield a low impedance path for current flowing through said output means when conduction in said first transistor is terminated.

11. A switching circuit as defined in claim 9 in combination with means operative in response to another polarity of said input signal to render a third transistor in said bridge circuit conductive when said enabling means is operated, means responsive to said other polarity of input signal to render a fourth transistor in said bridge circuit conductive, said third and fourth transistors being in nonadjacent branches of said bridge circuit, and conduction in said third transistor being terminated upon disablement of said enabling means.

12. In a circuit for supplying alternating current to a reactive load, a plurality of switches connected in a bridge configuration, said switches being operable to conduct current in response to a signal condition, a transformer primary connected across one diagonal of said bridge, a direct current source connected across the other diagonal of said bridge, a source of input signals of alternate polarity, first enabling means responsive to one polarity of said input signals to apply said signal condition to a first of said switching means, second enabling means responsive to said one polarity of input signals to apply said signal condition to a second of said switching means, said first and second switching means being in non-adjacent branches of said bridge circuit, means operative a predetermined time after application of said input signal to remove said signal condition from said first switching means, and a unidirectional current conduction path including said second switching means and said transformer primary, oriented to dissipate the reactive energy stored in said reactive load upon removal of said signal condition from said first switching means.

13. An inverter circuit comprising a plurality of transistors in a bridge circuit, said transistors having emitter, base, and collector electrodes, unidirectional current conducting means connected between the emitter and collector of each said transistors and polarized to conduct current from collector to emitter, a source of direct current connected across one diagonal of said bridge circuit, output means connected across the other diagonal of said bridge circuit, a source of input voltages of alternate polarity, first voltage responsive means responsive to said input voltages to normally retain a first and second of said transistors non-conducting, second voltage responsive means selectively operative in response to the polarity of said input voltages to render either a third or a fourth of said transistors conducting, third voltage responsive means selectively operative in response to the polarity of said input voltages to render either said first or said second transistor conducting, said second and third voltage responsive means coincidently rendering conductive transistors in nonadjacent branches of said bridge circuit, and voltage responsive means operative a preselected time after application of each said input signals to render said third voltage responsive means inoperative and thereby terminate conduction in either said first or said second transistor.

References Cited by the Examiner
UNITED STATES PATENTS 2,809,303  10/1957  Collins _____ 307—88.5
2,985,772  5/1961   Pittman et al. ____ 317—148.5 X JOHN F. COUCH, *Primary Examiner.*

LLOYD McCOLLUM, SAMUEL BERNSTEIN, MILTON O. HIRSHFIELD, *Examiners.*

D. J. YUSKO, J. J. KISSANE, G. G. GOLDBERG,
*Assistant Examiners.*